J. W. SWARTZ.
COMPARTMENT FRUIT CAR.
APPLICATION FILED OCT. 10, 1914.

1,134,423.  Patented Apr. 6, 1915.

WITNESSES
Samuel Payne
Max N. Skolony

INVENTOR
J. W. Swartz.
By Henry C. Evert
ATTORNEY

UNITED STATES PATENT OFFICE.

JOHN W. SWARTZ, OF EAST LIVERPOOL, OHIO.

COMPARTMENT FRUIT-CAR.

1,134,423.

Specification of Letters Patent. Patented Apr. 6, 1915.

Application filed October 10, 1914. Serial No. 866,044.

*To all whom it may concern:*

Be it known that I, JOHN W. SWARTZ, a citizen of the United States of America, residing at East Liverpool, in the county of Columbiana and State of Ohio, have invented certain new and useful Improvements in Compartment Fruit-Cars, of which the following is a specification, reference being had therein to the accompanying drawing.

This invention relates to compartment fruit cars, and has for its object to provide a car of such class, in a manner as hereinafter set forth, provided with compartments capable of being used by different shippers.

A further object of the invention is to provide a fruit car with a series of compartments capable of being used by different shippers and each provided with a storage receptacle for the articles shipped.

A further object of the invention is to provide a fruit car with a compartment containing a series of superposed storage receptacles each capable of being used by different shippers.

Further objects of the invention are to provide a compartment fruit car, which is simple in its construction and arrangement, strong, durable, efficient and convenient in its use, readily set up, and comparatively inexpensive to manufacture.

With the foregoing and other objects in view, the invention consists of the novel construction, combination and arrangement of parts as hereinafter more specifically described and illustrated in the accompanying drawings, wherein is shown an embodiment of the invention, but it is to be understood that changes, variations and modifications can be resorted to which come within the scope of the claims hereunto appended.

Figure 1:
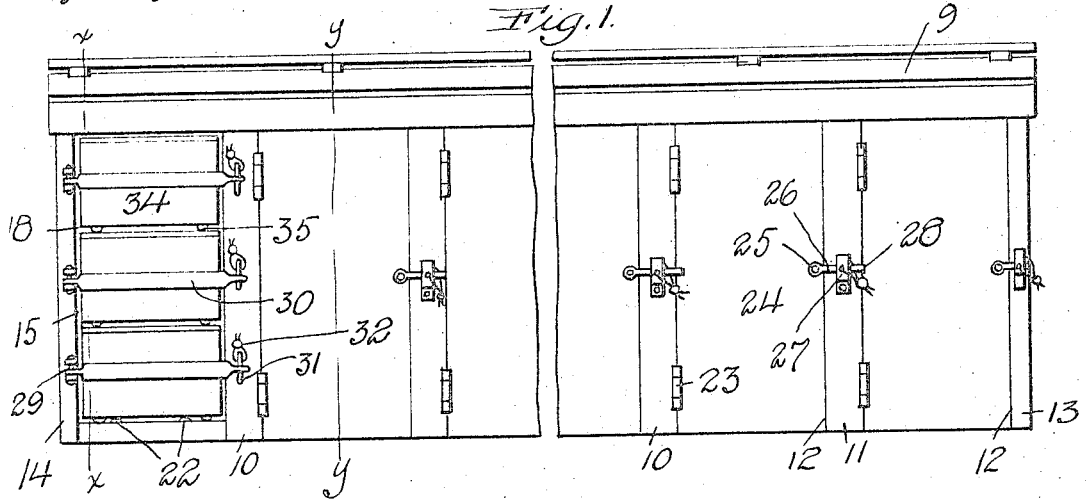
Figure 2:
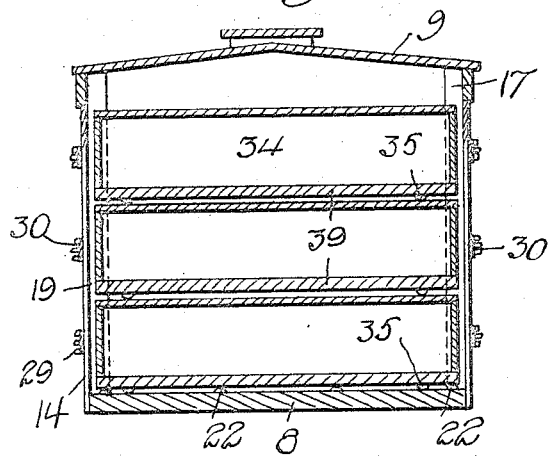
Figure 3:
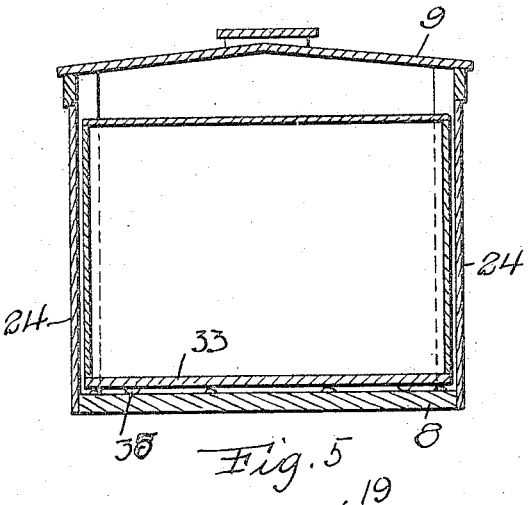
Figure 4:
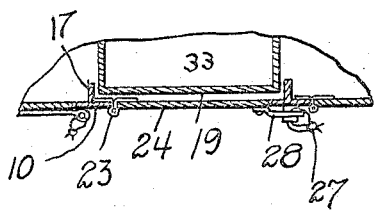
Figures 5, 6, 7:
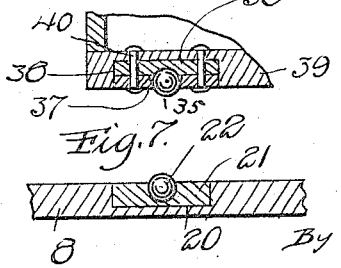

In the drawings wherein like reference characters denote corresponding parts throughout the several views:—Figure 1 is an elevation, broken away, of a compartment fruit car in accordance with this invention, Fig. 2 is a section on line X—X Fig. 1, Fig. 3 is a section on line Y—Y Fig. 1, Figs. 4, 5, 6, and 7 are sectional details.

Referring to the drawings in detail, 8 denotes the floor of the car, 9 the top, 10 and 11 vertically disposed division members to provide door openings 12, and which are secured to the edges of the floor 8 and extend to and secured with the top 9. The partition members 10 and 11 are arranged at each side of the car. At one end of each side of the car is positioned a vertically disposed member 13, the latter associates with a partition member 11 to provide a door opening 12. The vertical members 13 are secured with the floor 8 and top 9 of the car. At the other end of each side of the car, a vertically disposed member 14 is arranged, which associates with a partition member 10 to provide an opening 15, and interposed between the lower end of the members 14 and partition member 10.

Projecting inwardly from each of the partition division members 10 and 11 is a vertically disposed division member 17. One of the division members associates with one end of the car to provide a compartment 18, and furthermore said division members associated with each other and with the other end of the car to provide compartments 19. That portion of the floor 8 associated with each compartment is provided with a plurality of recesses 20, having arranged therein supports 21 for bearing balls 22, these latter projecting above the upper face of the floor 8.

Hinged as at 23 to each partition 10 is a door 24 for closing a door opening 12, and each of said doors 24 has pivotally connected thereto, as at 25, a latch 26 which is adapted to extend into a keeper 27, fixed to a partition member 11. The latch 26 and keeper 27 are connected together by a seal 28. Hinged as at 29 to each member 14 is a series of hasps 30 adapted to have their other ends engaged by keepers 31 to which are connected seals 32.

Arranged within each of the compartments 19 is a shipping receptacle 33 and arranged in the compartment 18 is a series of shipping receptacles 34. The bottom of the receptacle 33, as well as each of the receptacles 34 is provided with a plurality of bearing balls 35, which are maintained against a bearing plate 36, through the medium of a retaining plate 37. The plates 36 and 37 are arranged in a recess 38 formed in the bottom 39 of the shipping receptacle and the said plates 36 and 37 are secured to the bottom 39 of the shipping receptacle and the said plates 36 and 37 are secured to the bottom 39 by the holdfast devices 40. Each of the receptacles 34 is designed for use by a different shipper and the said receptacles 34 are retained in the compartment 18 through the medium of the hasp 30. Each receptacle 33 is designed for use by a different shipper and is retained in its compartment 19 through the medium of the doors 24. It is obvious, however, that the entire car can be used by the same shipper.

The providing of the bottoms of the shipping receptacles with the bearing balls and the floor 8 with bearings balls, it is obvious that the said receptacles can be conveniently shifted to store them in the car or to remove them therefrom.

What I claim is:—

1. A fruit car comprising a body portion provided with a plurality of compartments and independent doors for each of said compartments, said doors hinged with the car body, means for locking the doors, bearing balls mounted in the floor of each of said compartments, and a shipping receptacle arranged in each of said compartments upon the bearing balls and having its bottom provided with bearing balls capable of traveling upon the floor of its respective compartment.

2. A fruit car comprising a body portion provided with an open side compartment, bearing balls mounted in the floor of said compartment, a series of superposed shipping receptacles mounted in said compartment, the lowermost of said shipping receptacles positioned upon said bearing balls and having its bottom provided with bearing balls capable of traveling upon the floor of said compartment, the other of said receptacles having their bottoms provided with bearing balls engaging the tops of the lowermost receptacles, and means connected with the car body and extending across the open sides of said compartment for maintaining the receptacles within the compartment.

3. A fruit car comprising a body portion provided with an open side compartment, bearing balls mounted in and projecting above the floor of said compartment, a series of superposed receptacles arranged in the said compartments, the lowermost of said receptacles mounted upon said bearing balls, and means carried by the car body and extending across the open sides of said compartment for maintaining said receptacle in the compartment.

4. A fruit car comprising a car body provided with a compartment, a pair of doors hinged with the car body for closing said compartment, means for maintaining said doors in closed position, bearing balls mounted in and projecting above the floor of said compartment, and a shipping receptacle mounted in said compartment upon said bearing balls.

In testimony whereof I affix my signature in the presence of two witnesses.

JOHN W. SWARTZ.

Witnesses:
J. A. STEWART,
JAMES BOWERS.